Patented Nov. 28, 1933

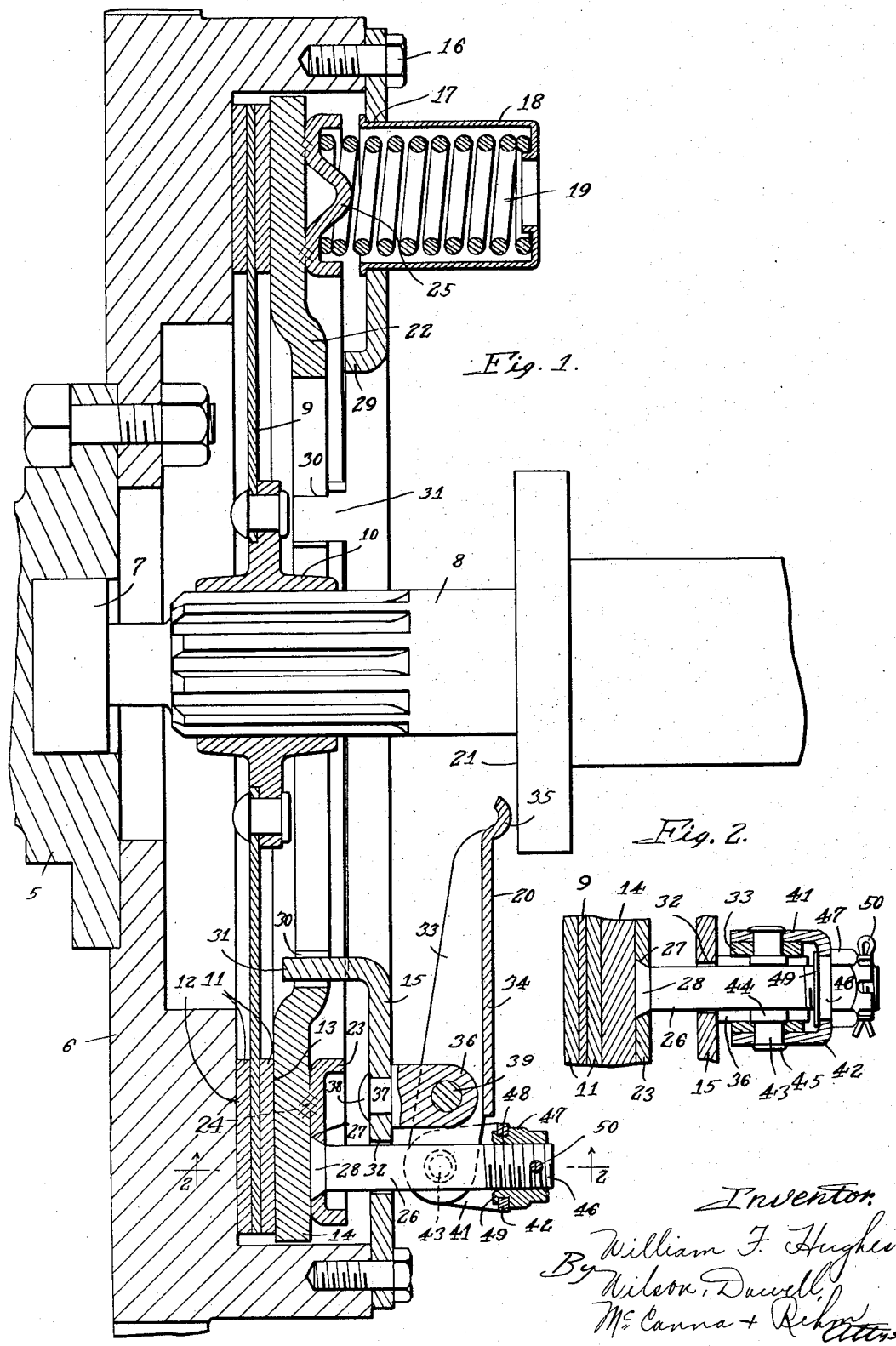

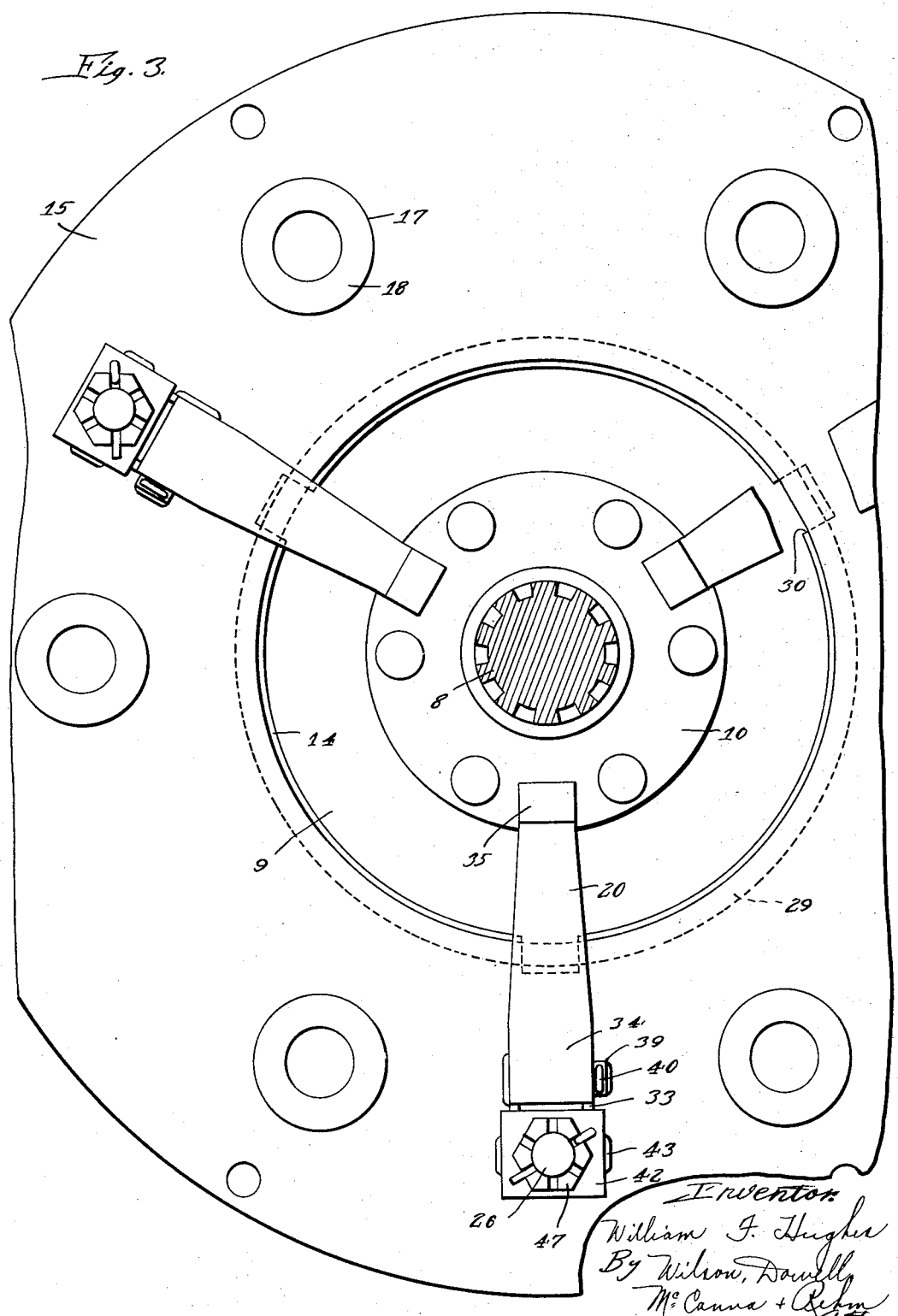

1,937,083

UNITED STATES PATENT OFFICE 1,937,083

FRICTION CLUTCH

William F. Hughes, Rockford, Ill., assignor to Rockford Drilling Machine Co., Rockford, Ill., a corporation of Illinois Application February 28, 1931. Serial No. 518,958

13 Claims. (Cl. 192—68)

This invention relates to friction clutches generally, and is particularly concerned with one adapted for use on a motor vehicle.

The principal object of my invention is to provide a clutch made up largely of sheet metal stampings with a view to cutting down machining operations to a minimum, and accordingly lowering cost, and also make for lightness and durability.

Another object is to provide a clutch embodying adjustments of simpler and cheaper construction than have been provided in the past, and ones which are so disposed that the adjustments can be made with greater ease and facility than has otherwise been the case.

Other objects and advantages will appear in the course of the following description, in which reference is made to the accompanying drawings, wherein—

Figure 1 is a central longitudinal section in a vertical plane through a clutch made in accordance with my invention;

Fig. 2 is a sectional detail on the line 2—2 of Figure 1, and

Fig. 3 is a rear view of Figure 1 with certain portions broken away because of the limited space available in the drawings.

The same reference numerals are applied to corresponding parts throughout the views.

Referring to Figure 1, the end of the engine crank shaft appears at 5 having the flywheel 6 mounted thereon in the usual way. A pilot bearing 7 in the end of the crank shaft receives the front end of the driven shaft 8 which extends rearwardly from the flywheel and clutch into the gear box of the transmission in the usual way. The clutch disc 9 has its center hub 10 splined on the shaft 8, and pads or facings 11 are fastened on opposite sides of the marginal portion for engagement on one side with the driving face 12 provided on the back of the flywheel and on the other side with the driving face 13 provided on the front of the pressure plate 14. 15 is the back plate fastened as at 16 to the rim of the flywheel and provided with a series of holes 17 equally spaced circumferentially thereof in which pressed sheet metal thimbles 18 are entered to serve as cages for coiled compression springs 19. The latter urge the pressure plate 14 toward the flywheel for engagement of the clutch. In the disengagement of the clutch, the pressure plate 14 is retracted against the action of the springs by means of release levers 20 actuated by the throwout collar 21 which in turn is given movement by depression of the clutch pedal in the usual way. The arrangement thus far generally described is, of course, well known. My invention is concerned with novel details of construction and arrangement in the various portions of the clutch as hereinafter fully described.

It has been common practice to make the pressure plate of cast iron. That, however, necessitated expensive machining operations, and the construction was also objectionable because of excessive weight and the fact that uneven heating and cooling of the pressure plate meant distortion, and cracks were frequently developed, necessitating replacements. According to my invention, therefore, the pressure plate 14 is made in the form of a ring-shaped sheet metal stamping, made of fairly thick sheet metal, weighing only a fraction of what an ordinary cast plate would weigh. Thus the driving face 13 is provided without the necessity of any machining operation. While the plate is made of thick sheet metal, its thickness is, nevertheless, about half the thickness of a cast plate, and in order to make the same rigid, I prefer to have the inner marginal portion struck so as to provide an annular reinforcing rib 22. There is, therefore, little likelihood of the plate getting out of shape. To still further insure rigidity of the pressure plate, I provide a backing therefor in the form of a stamped light sheet metal ring 23 preferably channel-shaped in cross-section suitably welded to the plate 14, as indicated at 24, by the trough portion of the channel, leaving the flanges of the channel projecting rearwardly from the plate annularly of the marginal portion thereof to provide the desired reinforcement. The composite plate thus constructed still weighs much less than the ordinary cast pressure plate and, due to the special forming thereof, is bound to keep its shape. It is evident that the annular flanges and the annular rib will serve not only to reinforce the plate, but also radiate heat therefrom whereby further to minimize likelihood of distortion. There is, of course, no danger whatever of this pressure plate developing cracks due to heating and cooling in service. The fact that stampings are used means a considerable saving in cost, since it is obvious that there is no comparison in the cost of the welding operation to the machining operations that were required with the cast plates. The use of the backing 23 is also taken advantage of to locate the inner ends of the springs 19 by forming hollow cone-shaped bosses 25 on the ring 23 in register with the holes 17 provided in the back plate 15 over which the inner ends of the springs 19 are arranged to fit. I also use the ring 23 as a means of anchoring a plurality of studs 26 to the pressure plate, by providing tapered holes 27 in the trough portion of the ring 23 to receive the tapered heads 28 formed on the inner ends of the studs 26. The studs are entered through the holes 27 to seat the heads 28 in the holes, and then the ring 23 is welded to the plate 14 to complete the assembly, thereby permanently and rigidly securing the studs to the plate. The studs 26 form a part of the clutch release mechanism hereinafter described.

The back plate is also often made in the form of a casting, but in keeping with the spirit of my invention, I prefer to have the same also stamped from sheet metal for lightness and cheapness. The desired rigidity is assured by flanging the inner edge, as appears at 29. Now, it will be observed that I have provided a plurality of notches 30 in the annularly ribbed inner marginal portion 22 of the pressure plate 14. Lugs 31 are formed integral with the flange 29 and project forwardly therefrom through the notches 30. The lugs, of which there are three to correspond to the three notches, although, of course, the particular number used is more or less immaterial, have a close working fit in the notches to permit the pressure plate 14 to have free movement relative to the back plate toward and away from the flywheel in the engagement and disengagement of the clutch. The lugs, in other words, make the pressure plate turn with the back plate and flywheel and relieve the studs 26 of the duty of making the pressure plate turn with the back plate, the said studs being passed freely through holes 32 provided in the back plate. It is obvious that no additional cost is involved in providing this interlocking feature, inasmuch as the notches and the lugs for entry therein are formed when the pressure plate and back plate are stamped and formed, as above described.

The release levers 20, in keeping with the spirit of the invention, are also stamped from sheet metal to a generally channel-shaped cross-section so as to provide spaced longitudinal flanges 33 on each of these levers joined by a web portion 34, the inner end of which is formed substantially half around to provide a finger 35 for engagement with the front of the throw-out collar 21. A square post 36 which has a reduced shank portion 37 riveted to the back plate 15, as indicated at 38, is provided in connection with each release lever and fits between the flanges 33 near the outer end of the lever, and accommodates a pivot pin 39 in a hole provided in the post in register with holes provided in the flanges 33. A cotter pin 40 is provided on the projecting end of the pin 39, as indicated in Fig. 3, to keep the parts in assembled relation. The holes in the flanges 33 for the pin 39 will be slightly elongated for a reason soon to appear. The web 34 terminates short of the outer end of the flanges 33, and the latter project beyond the post 36 between the ears 41 of a U-shaped yoke 42 suitably formed of sheet metal. Small studs 43 are passed through registering holes in the flanges 33 and ears 41 from the inside of the flanges so that the heads 44 on these studs abut the inside of the flanges, whereupon the projecting ends of the studs are upset, as indicated at 45, to permanently pivotally secure the parts together. The stud 26 in the case of each of these release levers 20, of which there are three, one for each stud, projects rearwardly from the back plate between the outer ends of the flanges 33, and has its rear end threaded as at 46 in a nut 47 rotatably mounted in the web of the yoke 42 between the ears 41 thereof. The nut 47 is suitably provided with a reduced shank portion 48 entered freely through a hole provided in the web of the yoke 42 and has the end of said shank swedged outwardly as at 49 to permanently assemble the nut on the yoke with freedom to turn with respect thereto. The nut is preferably castellated to permit fastening the same in adjusted position on the stud by means of a cotter pin 50. The loose fit of the nut in the yoke may be relied upon to compensate for the fact that the studs 43 have to travel in an arc about the pin 39 as a center, the deviation from a straight line motion being so slight. However, it is preferred to have the holes in the flanges 33 for the pin 39 slightly elongated so as to have the release lever free to move endwise a slight amount in its pivotal movement relative to the pin 39.

In operation, the nuts 47 are arranged to be adjusted so that when the clutch is engaged the release levers 20 will have the same clearance at their inner ends 35 with respect to the throw-out collar 21. This insures proper engagement and disengagement of the clutch in the fore and aft movement of the throw-out collar. After the clutch has been in service for a time, any unevenness in wear is readily compensated for by unscrewing one or more of the nuts 47 one or more turns than the rest. The cotter pins 50 prevent the clutch from losing its adjustment. It is evident that since the nuts 47 are fully exposed to the rear of the back plate, they are easily accessible upon removal of the inspection plate on the housing, thus greatly simplifying the matter of making an adjustment of the clutch. The swiveling of the nuts and the arrangement for locking the same with cotter pins instead of relying upon lock nuts has been found to be far more practical and permit of more accurate adjustment than previous forms of adjustments. Here again, of course, the fact that most of the parts are made of sheet metal is of advantage from the standpoints of low cost and less weight.

I claim:

1. In a friction clutch comprising a driving element, and a driven element, a back plate on the driving element, a pressure plate, spring means acting between the back plate and the pressure plate to urge the latter in a direction for engagement of the clutch, means for retracting the pressure plate against the action of said spring means, the back plate being provided with one or more lugs projecting forwardly from the inner marginal edge thereof substantially at right angles to the plane of the back plate, and said pressure plate having one or more openings provided therein slidably receiving said lugs whereby the pressure plate is caused to turn positively with the driving element but is free to move forwardly and rearwardly with respect to the back plate in the engagement and disengagement of the clutch.

2. In a friction clutch comprising a driving element, and a driven element, a back plate on the driving element, a pressure plate, spring means acting between the back plate and the pressure plate to urge the latter in a direction for engagement of the clutch, means for retracting the pressure plate against the action of said spring means, the said back plate being stamped from a piece of sheet metal formed to provide one or more lugs projecting forwardly from the inner marginal edge thereof substantially at right angles to the plane of the back plate, and said pressure plate having one or more notches provided in the inner marginal edge thereof slidably receiving said lugs whereby said pressure plate is caused to turn positively with the driving element but is free to move forwardly and rearwardly with respect to the back plate in the engagement and disengagement of the clutch.

3. In a friction clutch comprising a driving element, a driven element, a back plate on the driving element, a pressure plate, and spring means acting between the back plate and the pressure plate for normally urging the latter toward the driving element, means for retracting the pressure plate against the action of the spring means comprising a stud projecting rearwardly from the pressure plate through a hole provided in the back plate, the same having the rear end thereof threaded, a nut threaded on the rear end of said stud, a release lever pivotally mounted intermediate its ends on the back plate arranged to have pivotal movement communicated thereto at one end, and having its other end reaching toward said stud, and a member pivotally connected to the latter end of said lever and having said nut mounted thereon to swivel with respect thereto whereby to permit adjustment of the nut relative to the stud while maintaining a predetermined relation between the nut and said member.

4. In a friction clutch comprising a flywheel constituting the driving element, a clutch disc constituting the driven element, a back plate on the flywheel, a pressure plate, and spring means acting between the back plate and the pressure plate for normally urging the latter toward the flywheel, means for retracting the pressure plate against the action of the spring means comprising a stud projecting rearwardly from the pressure plate through a hole provided in the back plate, the same having the rear end thereof threaded, a nut threaded on the rear end of said stud, a release lever pivotally mounted intermediate its ends on the back plate and arranged to have pivotal movement communicated thereto at one end and having the other end bifurcated and straddling the projecting portion of said stud between the nut and the back plate, and a substantially U-shaped yoke member having said nut swiveled on the cross portion thereof, and having the two arms thereof pivotally connected to the bifurcated end of said lever, the swiveling of said nut on said yoke member permitting adjustment of the nut relative to the stud while maintaining a predetermined relation between the nut and yoke member.

5. In a friction clutch comprising a flywheel constituting the driving element, a clutch disc constituting the driven element, a back plate on the flywheel, a pressure plate, and spring means acting between the back plate and the pressure plate for normally urging the latter toward the flywheel, means for retracting the pressure plate against the action of the spring means comprising a stud projecting rearwardly from the pressure plate through a hole provided in the back plate, the same having the rear end thereof threaded, a nut threaded on the rear end of said stud, a stamped sheet metal release lever formed generally channel shaped in cross-section so as to provide a pair of longitudinal spaced side flanges joined by a web portion, a support for said lever extending from the back plate between the longitudinal flanges of the lever for pivotally mounting said lever intermediate its ends, the said lever being arranged to have pivotal movement communicated thereto at one end, the said longitudinal flanges providing a forked portion at the other end of said lever fitting about the projecting portion of the stud between the nut and the back plate, and a stamped sheet metal U-shaped yoke member having the arms thereof straddling the forked end of said lever and pivoted thereto, said nut being swiveled on and projecting from the cross portion of said yoke member whereby to permit adjustment of the nut on the stud without changing the relation of the nut to the yoke member.

6. In a friction clutch comprising a driving element, and a driven element, a back plate, a pressure plate, and means for moving the pressure plate relative to the back plate comprising a stud projecting rearwardly from the pressure plate through a hole provided in the back plate, the same having the rear end thereof threaded, a lever pivotally mounted intermediate its ends on the back plate and arranged to have pivotal movement communicated thereto at one end, the other end of said lever reaching toward said stud, and a nut threaded on the rear end of said stud and mounted on the last mentioned end of said lever so as to turn relative thereto but be held against endwise movement with respect thereto whereby to permit a change in the relationship of the nut to the stud while maintaining substantially the same relationship between the nut and the lever.

7. In a friction clutch comprising a driving element, and a driven element, a back plate, a pressure plate, and means for moving the pressure plate relative to the back plate comprising a stud projecting rearwardly from the pressure plate through a hole provided in the back plate, the same having the rear end thereof threaded, a lever pivotally mounted intermediate its ends on the back plate and arranged to have pivotal movement communicated thereto at one end and having the other end bifurcated and straddling the projecting end of said stud, a yoke member pivotally connected to the bifurcated end of the lever, and a nut threading on the end of said stud and swiveled on the yoke member whereby to permit adjustment of the nut relative to the stud while maintaining a predetermined relation between the nut and the lever.

8. In a friction clutch comprising a driving element, and a driven element, a back plate, a pressure plate, and means for moving the pressure plate relative to the back plate comprising a stud projecting rearwardly from the pressure plate through a hole provided in the back plate, the same having the rear end thereof threaded, a stamped sheet metal lever formed generally channel-shaped in cross-section so as to provide a pair of longitudinal spaced side flanges joined by a longitudinal web portion, a support for said lever extending from the back plate and having the longitudinal flanges of the lever pivotally mounted thereon intermediate the ends of said lever, said lever being arranged to have pivotal movement communicated thereto at one end, the said longitudinal flanges providing a forked portion at the other end of said lever straddling the projecting end of the stud, a stamped sheet metal U-shaped yoke member having the arms thereof straddling the forked end of the lever and pivoted thereto, and a nut swiveled on the cross portion of the yoke member and threaded on the stud whereby to permit adjustment of the nut on the stud without changing the relation of the nut to the lever.

9. In a clutch comprising a driving element and a driven element, a back plate, a pressure plate mounted so as to turn with the driving element and the back plate, and means for moving the pressure plate relative to the back plate comprising a lever pivotally mounted intermediate its ends on a support projecting rearwardly from the back plate and arranged to have pivotal movement communicated thereto at one end, a link connection between the pressure plate and the other end of said lever for communicating movement to the pressure plate from the lever, means for adjusting said link connection so that the relationship between the link and pressure plate is changed but the same relationship is maintained between the link and lever, and spring means acting to cause movement of the pressure plate in one direction.

10. In a clutch comprising a driving element and a driven element, a back plate, a pressure plate mounted to turn with the driving element and the back plate, and means for moving the pressure plate relative to the back plate comprising a part projecting rearwardly from the pressure plate, a lever pivotally mounted intermediate its ends on a support projecting rearwardly from the back plate and arranged to have pivotal movement communicated thereto at its inner end, the outer end being disposed for connection with the part reaching rearwardly from the pressure plate, an adjustable threaded connection directly between the lever and said part, the rotatable nut part of said connection being rigidly mounted on the lever and spring means acting normally to move the pressure plate in one direction.

11. In a friction clutch comprising a driving element, a driven element, a pressure plate for causing engagement between the driving and driven elements, and spring means acting to move the pressure plate in one direction, means for manually moving the pressure plate comprising a pivotally mounted release lever arranged to have pivotal movement communicated thereto to communicate movement to the pressure plate, a stud for connecting the pressure plate to the lever for movement with the latter, and a nut threaded on the stud and having a swivel mounting on the lever so as to be turnable with respect to the lever while held against axial movement relative thereto, whereby to permit adjustment of the connection between the lever and pressure plate while maintaining the same relation between the nut and the lever.

12. In a clutch comprising a driving element and a driven element, a back plate, a pressure plate, means for causing the pressure plate to turn with the driving element and the back plate, said means comprising a sliding connection between the pressure plate and the back plate permitting movement of the pressure plate relative to the back plate whereby to cause engagement or disengagement of the driving and driven elements, and means for moving the pressure plate relative to the back plate comprising a lever pivotally mounted intermediate its ends on a support projecting rearwardly from the back plate, said lever being arranged to have pivotal movement communicated thereto at its inner end, and an adjustable link connection between the pressure plate and the outer end of said lever, said connection comprising a link pivotally connected at one end with the outer end of the lever, a stud mounted at one end on the pressure plate and having its other end threaded and reaching to the free end of the link, and a nut swiveled on the link and adjustably threaded on the threaded end of said stud.

13. In a clutch, the combination with a front driving member, of an assembly comprising a rear driving member arranged to turn with the front driving member, means for moving the driving members toward each other to engage a driven member therebetween, a stud extending rearwardly from the rear driving member and having a threaded portion, a post rigid with the front driving member, a lever pivoted on the post, and a nut swiveled on the lever so as to be free to turn with respect to the lever while held against axial movement with respect thereto, said nut being adjustably threaded on the threaded portion of said stud.

WILLIAM F. HUGHES.